United States Patent [19]

Andreoff

[11] 3,961,988

[45] June 8, 1976

[54] BATTERY COVER

[76] Inventor: Gerald F. Andreoff, 13208 Fleta Drive, La Mirada, Calif. 90638

[22] Filed: Apr. 28, 1975

[21] Appl. No.: 572,118

[52] U.S. Cl. .............................................. 136/181
[51] Int. Cl.² ......................................... H01M 10/02
[58] Field of Search ............ 136/166, 170, 171, 181

[56] References Cited
UNITED STATES PATENTS

| | | | |
|---|---|---|---|
| 2,022,595 | 11/1935 | Gowing | 136/181 |
| 2,902,532 | 9/1959 | Toce et al. | 136/170 |
| 3,061,662 | 10/1962 | Toce et al. | 136/166 |
| 3,457,119 | 7/1969 | Tench | 136/170 |
| 3,623,917 | 11/1971 | Chassoux | 136/171 |

*Primary Examiner*—Donald L. Walton

[57] ABSTRACT

The disclosure set forth in the following specification relates to a battery cover for purposes of covering a bank of storage batteries in adjacent relationship to each other. The battery cover comprises a first and second edge guard member in an L-shaped configuration having a bead along an edge thereof. The beads on the two respective edges are placed in opposite spaced relationship from each other over the batteries and a spanning member having a serrated gripping pincer engages the beads to span and hold the two L-shaped members in fixed relationship to each other overlying the batteries. The spanning member can be slid along the beads in order to accommodate variously spaced battery terminals for covering the exposed portions thereof. The entire configuration can be cemented in place to maintain the battery cover in fixed relationship over the bank of batteries.

8 Claims, 3 Drawing Figures

BATTERY COVER

BACKGROUND OF THE INVENTION

1. Field of the Invention

The field of this invention lies within the storage battery art. In particular, it lies within the art related to safety engineering with respect to a bank of storage batteries, such as those that can be used in power stations or other areas when uninterrupted power is desired.

2. The Prior Art

The prior art related to storage batteries for switch gear and emergency light and power in both power stations and industrial plants generally incorporates the utilization of banks of batteries. In particular, storage batteries are maintained under standard engineering practice, to provide an uninterrupted power supply.

The batteries are maintained on a standby basis in a protected and easily utilized manner. The maintenance of the battery bank is most important, and it is incumbent upon operators of switch gear for both industrial and utility uses to provide such batteries. If not, the switch gear, emergency lighting and other equipment cannot be operated.

The batteries provide large amounts of power for short periods of time. The electrical power is instantly available and is essential for today's industrial and commercial world for such periods.

As a consequence, if for any reason failure of the AC power supply occurs, the battery bank will furnish all the power required for operating circuit breakers and switch gear to maintain electrical control.

The foregoing banks of batteries are generally maintained on a rack. The rack supports the batteries in aligned juxtaposition to each other. The batteries are joined together electrically in order to allow their combined power to emanate from one particular connection. In particular, a series of bus bars are usually provided between the terminals of all the batteries.

The bus bars and the batteries on the rack are generally physically exposed. This has detracted from the operation of the batteries when various liquids or other materials have been accidentally thrown on the battery terminals. In addition thereto, a substantial safety hazard is encountered when the terminals are exposed. The power across the bus bars between the batteries is sufficient to cause serious injury and loss of life. In the past, there has been little or no consideration for coverage of the terminals, for either safety purposes, or to maintain efficiency of operation and cleanliness thereof.

This invention overcomes the deficiencies of the prior art by providing a readily usable cover for the batteries to protect them against contamination and operators from safety hazards. The cover is designed to accommodate variously sized batteries. Furthermore, the cover is also designed so that the opening of the cover can accommodate variously spaced batteries. In other words, it can be tailored to numerous sizes of batteries, as well as numerous lengths of batteries and various banks with variable terminals and bus bars as to both location and size.

As a consequence, this invention is a significant step forward in the art for purposes of providing covers to banks of batteries for safety and efficiency of operation.

SUMMARY OF THE INVENTION

In summation, this invention comprises a novel battery cover for a bank of batteries wherein the cover can be modified with respect to the size and quantity of the batteries it is to cover.

More particularly, the battery cover of this invention incorporates a pair of oppositely spaced L-shaped members having a bead along one edge of each. The oppositely spaced members are configured with an L-shaped cross section wherein one leg of the L covers the edge region of the batteries and the other leg of the L covers the top of the battery and incorporates the bead on the edge thereof. The two respective oppositely placed L-shaped members are spanned by a member having a serrated cross sectional set of gripping pincers which provide a holding force on the bead.

The pincers have a series of serrated transverse channels which are centered approximately a quarter of an inch apart, so that variously sized batteries can be spanned and covered by the serrated bridging member. Thus, the L-shaped members can be spanned by the bridging member in variously configured spacing arrangements across the width of the batteries. Furthermore, the bridging members can be moved axially along the length of the bank of batteries to provide various spacings for coverage of variably configured terminals.

As a consequence, this invention allows for coverage of banks of batteries and their terminals wherein the size of the respective batteries, as well as the number of batteries along the length thereof, can be accommodated by the inventive cover hereof.

BRIEF DESCRIPTION OF THE DRAWINGS

The invention will be more clearly understood by reference to the description below taken in conjunction with the accompanying drawings wherein.

DESCRIPTION OF THE PREFERRED EMBODIMENTS

Figure 1:
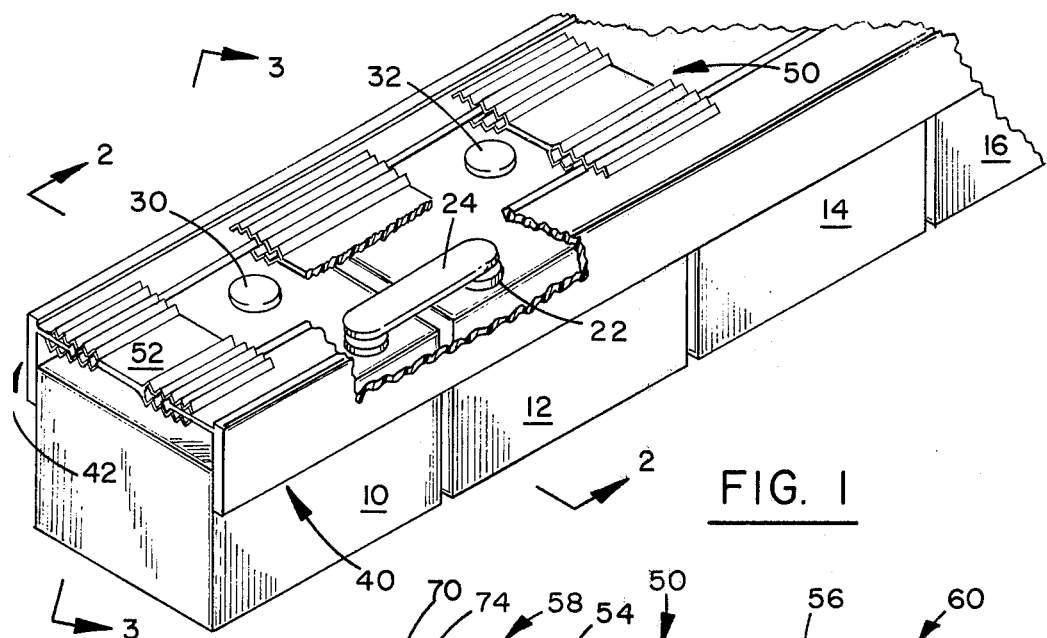
FIG. 1 shows a perspective fragmented view of a bank of batteries having bus bars between the respective batteries covered by the invention.
Figure 2:
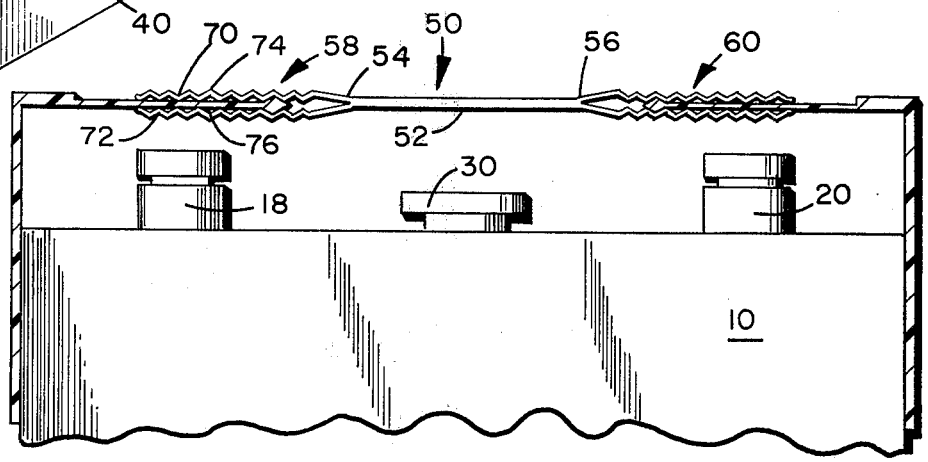
FIG. 2 shows an elevated end view of this invention in the direction of lines 2—2 of FIG. 1; and, FIG. 3 shows a fragmented perspective detailed view of the spacer in cooperation with the angled L-shaped cover members of this invention in the direction of lines 3—3 of FIG. 1.
Figure 3:
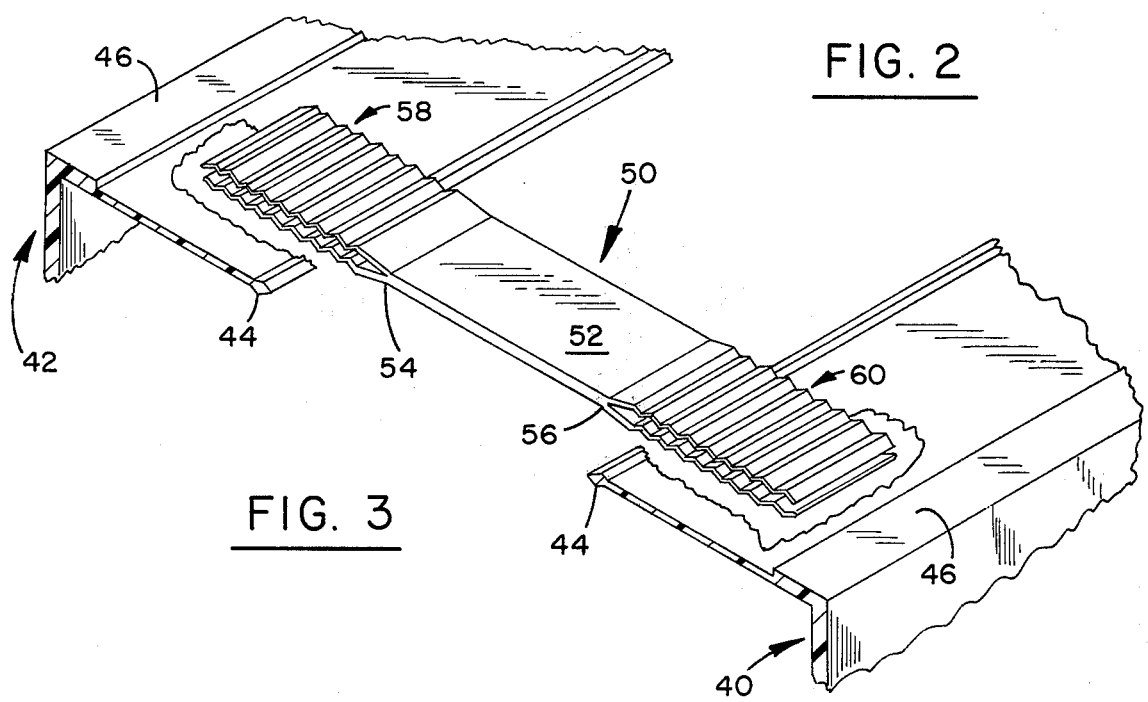

Looking more particularly at FIG. 1 and the attendant figures, it can be seen that a series of batteries 10, 12, 14 and 16 have been shown in aligned adjacent relationship. The batteries 10 through 16 are provided with regular terminals, seen as terminals 18, 20, and 22, connected by bus bars, one of which is shown as bus bar 24.

All of the batteries are connected by the bus bars at their respective terminals so that an aggregate source of power can be supplied from the batteries 10 through 16 or any number thereof. This provides a source of power equivalent to the power of each battery multiplied by their number and reduced by whatever resistance exists within the interconnecting bus bars, as well as the internal resistance of the batteries.

The batteries each respectively have an opening such as the openings 30 and 32. The openings 30 and 32 provide ports to the battery. The fluid within the battery can be serviced through ports 30.

As stated in the Background of the Invention, the batteries 10, 12, 14 and 16 are utilized in a rack or other area to provide continuous power. For instance, when the AC power supply is expunged or diminished for some reason, the batteries can take over the power duty function for operating the switch gear, or other attendant devices for a utility or industrial power network. Furthermore, in some applications, a continuous source of power must be maintained, in order to prevent a collapse of the memory functions of the computer, or to prevent certain alternative changes within the pre-established program of the computer.

Thus, battery banks of the types shown by batteries 10 through 16 are used today for many purposes. However, in the cases where they are used, there has been little or no protection from damage to the battery terminals, as well as general contamination. Furthermore, there has been no protection of the battery terminals to provide a degree of safety to operators in adjacent relationship.

In order to provide the foregoing cover, a pair of elongated L-shaped members 40 and 42 have been implaced along the edges of the batteries. The elongated members 40 and 42 have been extruded from a plastic die to provide an L-shaped cross sectional member with a bead 44 along an edge thereof. The bead 44 is such that it has a diamond shaped cross section. In addition thereto, a stepped reinforcement 46 is provided along the edge of each L-shaped member so that the angular corners thereof, where the cover laps over the edge of the battery, will not crack under normal abuse.

The size of the L-shaped members 40 and 42 which overhang the edges of the battery are allowed to be of any particular length, so long as they provide the necessary coverage and spacing.

The material from which the members 40 and 42 are extruded can be of any suitable plastic wherein a degree of pliability is provided. However, the plastic in its molded state should be sufficiently resilient to conform to the edge regions of a battery without sagging.

Spanning the L-shaped cross sectional members 40 and 42 are a series of bridging members or spacers 50. The spacers 50 have a central bridge portion 52, which extends to a pair of angular portions 54 and 56. The angular portions 54 and 56 respectively bifurcate into a pair of serrated portions respectively 58 and 60 at their apex. The serrated portions 58 and 60 comprise pincers having a serrated cross sectional conformation. Each one of the serrated pincers 58 and 60 comprise lands 70 and 72 and grooved portions 74 and 76. The grooved portions 74 and 76 are provided with depressed centers along the length thereof in the manner of a trough. The centers of the troughs are offset in this particular instance by quarter inch spacing. Thus, the spacing member or bridging member 50 can accommodate variously sized batteries by quarter inch variances or increments.

The two pincer portions 58 and 60 are spread from the apex 54 and 56 of the bifurcations of the bridging member 50 in a springlike manner. At these particular apex points, there should be sufficient material so that the bridging member 50 does not break and unduly fracture when it is spread apart over the diamond shaped bead 44.

The bridging member 50 can be slid along with the grooves 74 and 76 respectively overlapping the bead 44. Thus, the members 50 can be slid axially along the length of the bank of batteries. This accommodates different space relationships of the terminals 18 and 22 and the bus bars 24 and 26 so that variously configured bus bar arrangements and batteries can be accommodated by the bridging member 50 which serves as a cover thereover.

The bridging member 50 can be made by extruding a substantially elongated portion thereof. After the extended bridging member 50 has been extruded, it can then be cut to various lengths to accommodate variously sized arrangements of batteries and bus bars.

In lieu of the arrangement as generally shown herein, the pincers 58 and 60 can be extruded as a portion of the members 40 and 42. In this manner, the bead 44 would be a portion of the bridging member 50 so that it can be held therein, thereby reversing the foregoing configuration. Thus, the bridging member can be provided with the bead or male arrangement while the edge portion 40 and 42 of the L-shaped configuration can be provided with the pincers or the female portion.

Other suitable arrangements for purposes of providing a sliding frictional engagement of the three respective members can be effectuated. In other words, the pincers can comprise merely slots, or relieved portions which lock onto other mating portions of the L-shaped cross sectional configuration of the edge regions. In this manner, numerously configured designs can be utilized to accommodate the general overall configuration of a battery cover.

The bridging members 50 can be provided to a user in any suitable length or can be provided as a basic stock portion which is then cut by the user and slid into place in accommodating relationship to the L-shaped members 40 and 42.

In the specific embodiment as shown, the members 40, 42 and 50 have been extruded from polyvinylchloride (PVC). The PVC extrusions are cut to the appropriate length to accommodate the length of the bank of batteries.

After the bridging member 50 has been slid into place with the diamond shaped bead 44 inserted into the pincers 58 and 60, the nesting relationship can then be glued in place by utilizing a PVC type of glue. This enables a user to provide a customized fully integrated and bonded battery cover to any series of batteries or bank of batteries that are placed in adjacent relationship to each other and electrically connected through bus bars.

If it is desired, the members 40 and 42 can be non-adhered to the bridging member 50 in order to provide flexibility and removal of the members for disassembly and re-use at a later time.

As can be appreciated from the foregoing specification, the invention is to be read broadly as to the scope and spirit thereof in light of the following claims related to covers for batteries in general.

I claim:

1. The improvement in a cover for a bank of electrical batteries for covering the terminals thereof comprising:
    a pair of elongated L-shaped angular members which conform at least in part at their angular portions to the edges of a series of batteries placed in alignment with each other;